United States Patent [19]

Hill

[11] 4,259,399

[45] Mar. 31, 1981

[54] ULTRASONIC NONWOVEN BONDING

[75] Inventor: Berlie R. Hill, Cana, Va.

[73] Assignee: Burlington Industries, Inc., Greensboro, N.C.

[21] Appl. No.: 938,647

[22] Filed: Aug. 31, 1978

[51] Int. Cl.³ .............................................. D04H 1/58
[52] U.S. Cl. .................................... 428/288; 156/731; 156/238; 428/296; 428/340; 428/373
[58] Field of Search ............... 418/284, 286, 288, 287, 418/296, 297, 373, 340; 156/73.1, 238

[56] References Cited

U.S. PATENT DOCUMENTS

| | | | |
|---|---|---|---|
| 3,575,752 | 4/1971 | Carpenter | 156/73.1 |
| 3,817,802 | 6/1974 | Meyer | 156/73.1 |
| 3,879,256 | 4/1975 | Rust | 156/73.1 |
| 3,949,127 | 4/1976 | Ostermeur | 428/296 |
| 3,966,519 | 6/1976 | Mitchell et al. | 156/73.1 |
| 3,993,532 | 11/1976 | McDonald | 156/73.1 |
| 4,086,112 | 4/1978 | Porter | 156/73.1 |

FOREIGN PATENT DOCUMENTS 2259203  6/1974  Fed. Rep. of Germany .
1092052 11/1967  United Kingdom .

*Primary Examiner*—James J. Bell
*Attorney, Agent, or Firm*—Cushman, Darby & Cushman

[57] ABSTRACT

A method of forming an improved, nonwoven lightweight (about 3 oz./yd.² or less) fabric from a batt of random, loose ultrasonically fusible (i.e., thermoplastic) fibers. A product is produced by utilizing an ultrasonic welding machine having a patterned roll anvil or equivalent, and a horn, and a carrier of flexible sheet material such as tissue paper, heat transfer print paper or other nonthermoplastic sheets, capable of drawing and spreading out ultrasonic energy from the machine. The batt and the carrier are disposed in face to face abutting relationship and are progressively fed together between the horn and the anvil of the machine while supplying ultrasonic energy to the batt with the machine sufficient to form the batt into a nonwoven fabric. The carrier may be disposed against the horn or against the anvil depending on the particular carriers and batts used, and for a given carrier and batt the formed nonwoven fabric will have slightly different properties depending upon whether the carrier is against the horn or the anvil. When heat transfer print paper is used the nonwoven fabric is heat set before separation from the paper, and a printed nonwoven fabric results. Decorative nonwoven fabrics may also be produced by disposing contrasting fibers on the batt before feeding to the machine.

8 Claims, 6 Drawing Figures

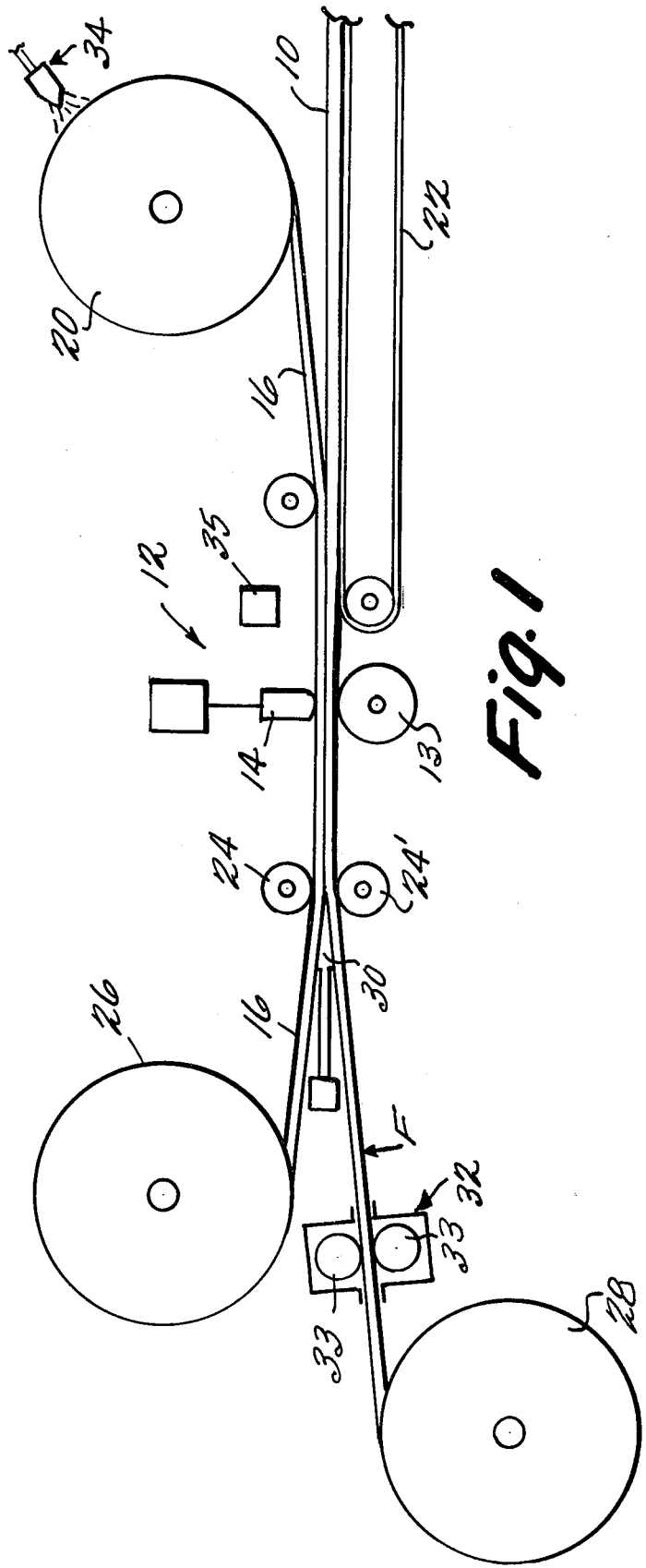
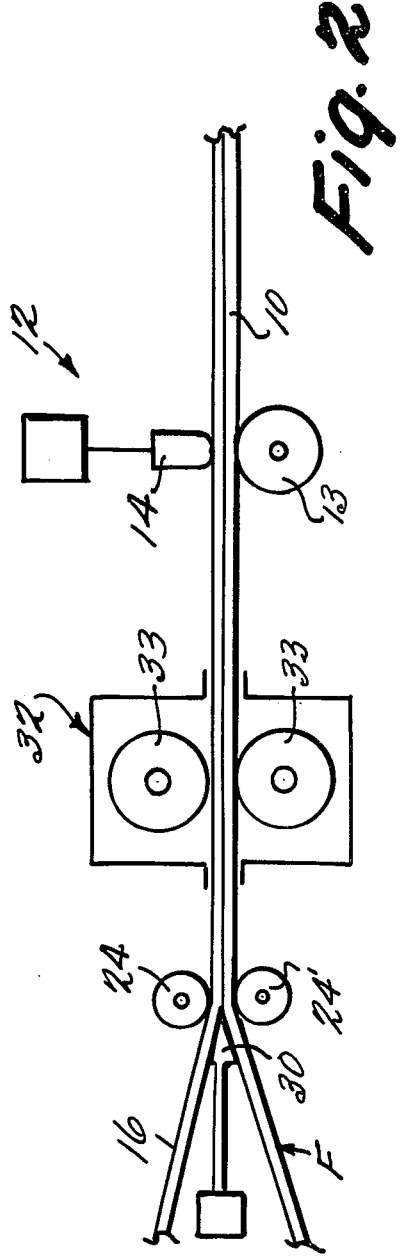

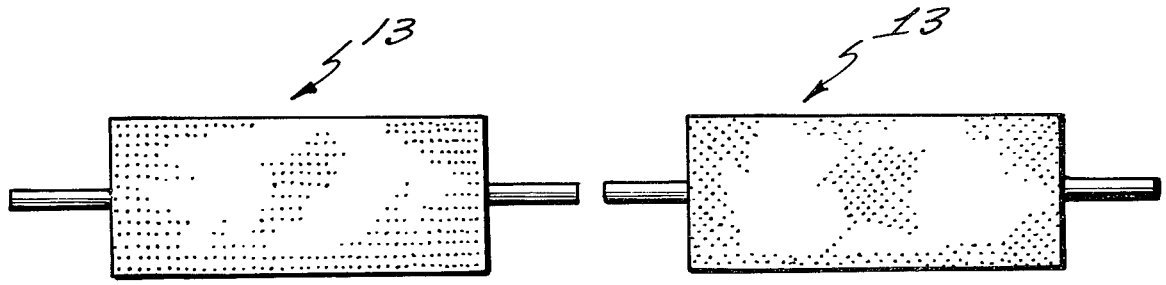
Fig. 3a　　　　　　Fig. 3b
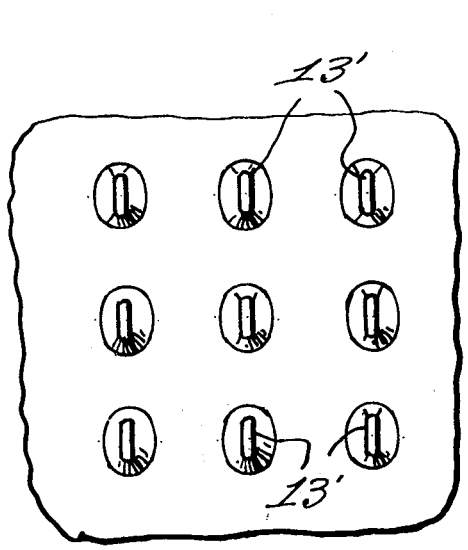　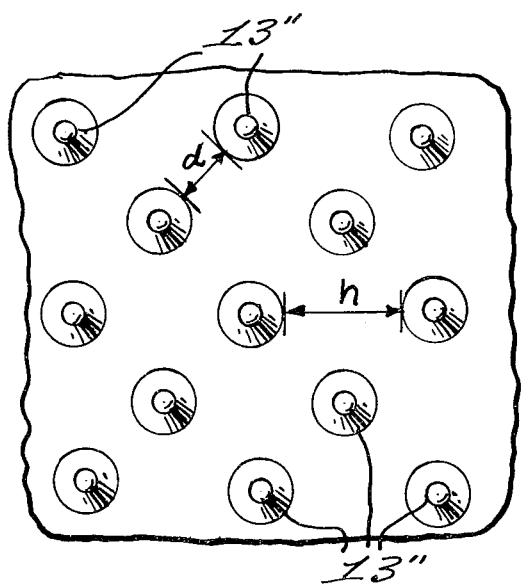
Fig. 4a　　　　　　Fig. 4b

ULTRASONIC NONWOVEN BONDING

BACKGROUND AND SUMMARY OF THE INVENTION

The ability to form nonwoven fabrics from batts of random, loose thermoplastic fibers and the like has been recognized in the prior patent literature. For instance, see German Offenlegungsschrift No. 2,259,203 and U.S. Pat. Nos. 3,949,127 and 3,966,519. U.S. Pat. No. 4,086,112 teaches the direct printing of heavyweight fabrics by feeding the fabric and heat transfer print paper between a horn and an anvil having large bonding areas. Prior art methods of production of nonwovens ultrasonically have experienced a number of drawbacks, however, when applied to light-weight batts, which have adversely affected the widespread commercialization of the ultrasonic production of nonwovens.

Prior art techniques for the ultrasonic formation of nonwoven fabrics from lightweight (under about 3 oz.-/yd.$^2$) thermoplastic batts have encountered one or more of the following drawbacks: Unacceptable fabric properties (especially strength and hand). Slow processing speeds. Equipment malfunction due to burnup of the anvil roller should the batt break or cease to be fed between the horn and roller, or should scrap metal inadvertently appear in the batt. Unacceptable aesthetic characteristics of the fabric, especially surface characteristics.

According to the present invention, all of the above drawbacks are overcome, and additionally it is possible to produce printed and decorative fabrics directly from lightweight fiber batts without a dyeing step.

According to the method of the present invention, a lightweight nonwoven fabric is formed from a batt of random, loose, ultrasonically fusible (i.e., thermoplastic) fibers, utilizing an ultrasonic welding machine having a patterned roll anvil or the equivalent, and a horn, and a carrier of flexible sheet material capable of drawing and spreading out ultrasonic energy from the machine. The method comprises the steps of disposing the lightweight batt and carrier in face to face abutting relationship; progressively automatically feeding the batt and carrier together between the horn and anvil of the machine; supplying ultrasonic energy to the batt with the machine sufficient to form the batt into a nonwoven fabric; and separating the batt and carrier from each other. The use of the carrier unexpectedly results in increased fabric strength for lightweight fabrics (i.e., 3 oz./yd.$^2$ and less, depending on fiber denier), results in a fabric having smooth surfaces and good textile hand, and thus better aesthetic characteristics, allows a quantum increase in speed of bonding and positively prevents damage to the anvil roller even if the batts being fed to the ultrasonic machine should break or scrap metal should inadvertently become associated therewith.

In practicing the present method, the carrier may be disposed against the horn and the batt against the anvil or vice versa. Normally, the lightweight fabric may be formed more quickly if the carrier is disposed adjacent the horn, however, for formation of some specialized fabrics, the carrier should be disposed against the anvil and for a smooth surface fabric on both faces the carrier is more preferably disposed against the anvil.

One improved fabric that may be produced according to the present invention is a decorative or printed lightweight fabric with good textile hand which may be produced without any accessory forming steps (except heat setting), such as dyeing. In forming a decorative fabric, contrasting fibers—acrylic fibers—are disposed on the batt either randomly or in a given pattern by a yarn control machine prior to feeding the batt through the ultrasonic welding machine. The contrasting fibers become part of the nonwoven fabric formed. Printed fabrics are formed by using heat transfer print paper as the carrier, and then passing the formed lightweight nonwoven fabric and transfer paper through a heat setting operation before separating the carrier from the formed fabric. The quality of the print on the formed fabric utilizing this technique is substantially identical to the print quality when heat transfer print paper is used in conventional techniques.

According to the present invention, it has been recognized that the source of the problem of insufficient fabric strength or hand characteristics that resulted in the prior art in bonding lightweight fabrics, was the size and spacing of contact points. The patterned roll (or equivalent) that is utilized must have points of optimum size, and an optimum number of points per unit area. If the weld points are too large, the fabric produced will be weaker and the fabric is unacceptable from an aesthetic point of view having poor hand and surface characteristics; if the weld points are too small the fabric will also have less strength than desired. According to the invention, the points of the patterned roller or the like that come into contact with the fabric have an area of about 0.003 sq. in., which has been found to be the optimum for fabric strength and textile hand.

If further fabric strength is required, Heterofil binder fibers (or like bicomponent core and sheath filament fibers) may be utilized, typically in blends of 25% and 50%, with polyester or other thermoplastic fibers.

Suitable carriers include brown paper, tissue paper, heat transfer print paper, Nomex, nonthermoplastic sheets in general, and rayon. In general, the carrier may be any flexible smooth-surfaced sheet material that is readily detachable from the formed fabric (that is, will not be ultrasonically bonded irremovably to the formed fabric), and is capable of drawing and spreading out ultrasonic energy from the machine.

It is the primary object of the present invention to produce improved lightweight nonwoven fabrics from lightweight fiber batts utilizing ultrasonic bonding, with increased process efficiency. This and other objects of the invention will become clear from an inspection of the detailed description of the invention, and from the appended claims.

BRIEF DESCRIPTION OF THE DRAWINGS

FIG. 1 is a schematic view illustrating an exemplary process of practicing the present invention, providing the carrier against the ultrasonic horn;

FIG. 2 is a detailed schematic alternative embodiment to FIG. 1, wherein heat transfer print paper is provided as the carrier;

FIGS. 3a and 3b are front and detail surface views, respectively, of an exemplary patterned roll anvil utilizable for practicing the present invention; and FIGS. 4a and 4b are front and detail surface views, respectively, of another patterned roll anvil suitable for practicing the present invention.

DETAILED DESCRIPTION OF THE DRAWINGS

FIGS. 1 and 2 show exemplary apparatus for practicing methods according to the present invention, resulting in the formation of a nonwoven fabric F from a lightweight batt 10 of random, loose, ultrasonically fusible fibers utilizing an ultrasonic welding machine 12 having a patterned roll anvil 13 (or the equivalent) and a horn 14, and a carrier 16 of flexible sheet material capable of drawing and spreading out ultrasonic energy from the machine 12. The term "lightweight" as used in the present specification and claims, when describing the fiber batts or nonwoven fabrics produced, means batts or fabrics having a weight of about 3 oz./yd.$^2$ or less, depending upon denier. However, it is to be understood that the fiber batt and fabric weights for which the advantageous unexpected results according to the invention are significant are not capable of exact definition because the fabric weights are dependent upon the fiber denier. For fibers having a count of 3 denier, the invention is significantly advantageous over the prior art for fabrics of 3 oz./yd.$^2$ or less, and particularly for fabrics 2 oz./yd.$^2$ or less; however, for fibers having a count of less than 3 denier, the significant fabric weights will tend to decrease, and for fibers having a count higher than 3 denier, the significant weights will tend to increase.

The ultrasonic welding machine 12 may be selected from a wide variety of commercially available ultrasonic welding machines. Where fabrics of increased width are to be formed, a single elongated roller 13 preferably is provided as the roller, and a plurality of elongated horns 14 of successive machines are arranged in staggered position across the width of the fabric. The horn may be in the form of a bar, as illustrated in the drawings, or may be in the form of a roll or other conventional form. The anvil has associated therewith a patterned surface means for effecting suitable bonding of the fibers in the batt 10 when brought into contact therewith. The patterned surface means preferably takes the form of a patterned surface of the roll 13 itself, as shown in the drawings.

The roll 13, as shown most clearly in FIGS. 3 and 4, has a patterned configuration with an optimum number and size of upstanding points 13', 13", for fabric strength and hand. If the points 13', 13" are too large, the resulting fabric will be weakened and have an unacceptable appearance and hand, and if the points are too small, the fabric again will be weakened.

Both of the rollers in FIGS. 3 and 4 have points 13', 13", respectively, that have a tip area of about 0.003 sq. in., which has been found to be the optimum area for effecting proper bonding with good hand for lightweight fabrics. In the FIG. 3 embodiment, the points 13' have a distal surface area with an oblong shape (see FIG. 3b), being long in the machine direction (along the circumference of the roll), and narrow in the cross-machine direction (along the length of the roll), and the points are disposed in regular columns and rows, the columns extending around the circumference of the roller 13 and disposed in a plane generally perpendicular to the axis of rotation of the roller 13, and the rows extending along the length of the roller 13, generally parallel to the axis of rotation of the roller 13. The points 13" of the roller 13 shown in FIG. 4 are truncated cones, having a circular tip (distal surface area) of about 1/32 in. in radius, with a diagonal distance d between points of about 1/16 in., and a horizontal distance h between points of about 3/32 in. Alternatively, a corduroy, nonwoven fabric F may be produced by utilizing a roll 13 having a plurality of elongated narrow ridges formed along the length thereof, and spaced along the circumference thereof.

The lightweight fiber batt 10 preferably is a batt of thermoplastic fibers, such as polyester, and the batt need not be needled before formation into the nonwoven fabric F. To provide added strength Heterofil, Cambrelle, or like bicomponent sheet and core filament fibers may be utilized. Typical blends eminently suitable for the lightweight batt 10 include 25% Heterofil, 75% polyester; and 50% Heterofil, 50% polyester.

The carrier sheet 16 may be selected from a variety of flexible, smooth-surfaced sheet materials capable of drawing and spreading out ultrasonic energy from the machine. Not all flexible sheet materials have this capability; however, tissue paper, Nomex, brown paper, heat transfer print paper, rayon and many other non-thermoplastic sheets do have this characteristic. The carrier 16 must be one that may be readily separated from the nonwoven fabric F formed.

In FIG. 1, exemplary apparatus is provided for formation of a lightweight nonwoven fabric F from a lightweight fiber batt 10 on a relatively high speed, commercial scale. The apparatus includes a roll 20 of carrier sheet 16, and a conveyor 22 for feeding the carrier 16 and batt 10, respectively to the machine 12. The batt 10 will normally not have sufficient strength to be transported to the machine 12 directly from a roll, therefore a conveyor 22 or the like is preferred. After treatment in the machine 12, the carrier 16 and formed nonwoven fabric F move between direction changing rolls 24, 24' and are fed to driven takeup rolls 26, 28, respectively. Preferably, some sort of separating structure 30 is provided between the carrier 16 and fabric F after the rolls 24, 24', to facilitate separation when separation may prove a problem. Because the fabric F is lightweight, too large of a tension force cannot be supplied by roller 28 or the like, otherwise fabric damage may result. The means 30 may comprise a knife blade, plurality of air jets, or like structure capable of facilitating separation without adverse affect on the fabric properties. Depending on the nature of the carrier 16, after collection of the roll 26, it may be reused for forming further fabric F, or may be put to another productive use.

In order to enhance the strength properties of the formed fabric F, it is preferred that the fabric F be heat set utilizing conventional heat setting apparatus shown diagrammatically at 32, including sets of heated rolls 33. Depending upon the nature of the carrier 16, and the formed fabric F, the heat setting may take place after separation of the carrier 16 and fabric F (as in FIG. 1), or before separation (as in FIG. 2).

The apparatus of FIG. 2 is especially suited for use when the carrier 16 is heat transfer print paper. If desired, the heat transfer print paper 16 may be sprayed with release agent (see apparatus 34 in FIG. 1) prior to disposition in engagement with the batt 10. The fabric produced utilizing heat transfer print paper is a finished, strong, printed, lightweight fabric suitable for a variety of end uses without subjecting it to dyeing or like accessory treatment steps. Additionally, decorative fabrics can be produced by disposing contrasting fibers on the batt 10 before being fed to the machine 12, such as by utilizing a yarn control feed device shown schematically at 35 in FIG. 1. The structure 35 disposes contrasting fibers in a pattern, or randomly, on the batt 10, such as dyed acrylic fibers. The added fibers become part of the nonwoven fabric F produced.

By utilizing the carrier 16 according to the present invention, it is possible to significantly increase the strength, desirable textile hand, and desirable appearance characteristics of the lightweight formed fabric F, and to very significantly increase the speed with which the fabric F can be formed. Additionally, the carrier 16 acts as a barrier between the horn 14 and patterned roll 13 so that even should the batts 10 break or should scrap metal be disposed within the batt, the horn will not burn the roller out (as would be the case without the carrier 16). The improved characteristics of the lightweight formed fabric, and improved efficiency of the method operation are best seen from the following table:

TABLE

| Carrier | Batt Weight (oz./yd.$^2$) | Fabric Thickness (inches) | Break Strength (lbs.) | Elongation (%) | Appearance | Process Speed (yd./min. max.) |
|---|---|---|---|---|---|---|
| none | 2.81 | .032 | 26.1 | 54.8 | poor | 4 |
| against anvil | 2.72 | .026 | 28.5 | 45.5 | good | 6 |
| against horn | 2.71 | .025 | 32.0 | 45.4 | good | 15 |

The table results are all for a batt 10 that is a 50/50 blend of Heterofil and polyester, using tissue paper as the carrier. For even lower weights, the differences in results are even more dramatic, especially in appearance and process speed; in fact batts under about 2 oz./yd.$^2$ are believed incapable of automatic feeding without a carrier. Break strength and elongation properties were improved even more significantly once the lightweight formed fabrics were heat set.

It will thus be seen that according to the present invention it is possible to improve process efficiency in the formation of lightweight nonwoven fabrics from fiber batts, by increasing the speed of the operation, and by positively preventing damage to the anvil roller. Additionally, according to the present invention, improved lightweight fabrics are produced having increased desirable break strength and elongation characteristics, and better appearance and hand, and printed and decorative fabrics can be produced without dyeing or printing steps.

While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all the equivalent methods, apparatus, and products.

What is claimed is:

1. A nonwoven fabric having a weight of about 3 oz./yd.$^2$ or less preformed from a batt of random, loose ultrasonically fusible fibers, the batt having a weight of about 3 oz./yd.$^2$ or less, and produced by utilizing an ultrasonic welding machine having a patterned roll anvil or the like and a horn, and a carrier of flexible sheet material, said carrier being capable of drawing and spreading out ultrasonic energy from the machine; and by following the steps of disposing the batt and the carrier in face-to-face abutting relationship; progressively feeding the batt and carrier together between the horn and the anvil of the machine; supplying ultrasonic energy to the batt with the machine sufficient to form the batt into nonwoven fabric; and separating the batt and carrier after passage through the horn and anvil.

2. A nonwoven fabric as recited in claim 1 which is produced by disposing the carrier against the horn and the batt against the anvil during feeding thereof.

3. A nonwoven fabric as recited in claim 1 produced by disposing the carrier against the anvil and the batt against the horn.

4. A nonwoven fabric as recited in claim 1 produced by heat setting the formed nonwoven fabric after separation thereof from the carrier.

5. A nonwoven fabric as recited in claim 1 having a fiber composition of substantially 100% polyester fibers.

6. A nonwoven fabric as reicted in claim 1 having a fiber composition which includes both bicomponent sheet and core filament fibers and polyester fibers.

7. A nonwoven fabric as recited in claim 1 having a weight of 2 oz./yd.$^2$ or less.

8. A decorative nonwoven fabric having a weight of about 3 oz./yd.$^2$ or less, formed from a batt of random, loose, ultrasonically fusible fibers, the batt having a weight of about 3 oz./yd.$^2$ or less, the fabric produced utilizing an ultrasonic welding machine having a patterned roll anvil or the like and a horn, and a carrier of flexible sheet material, said carrier being capable of drawing and spreading out ultrasonic energy from the machine, and produced by following the steps of disposing the batt and carrier in face-to-face abutting relationship; disposing contrasting fibers on the batt; progressively feeding the batt, with contrasting fibers thereon, and carrier together between the horn and anvil of the machine; supplying ultrasonic energy to the batt with the machine sufficient to form the batt into a nonwoven fabric with the contrasting fibers bonded integrally thereto; and separating the formed nonwoven fabric and the carrier.

* * * * *